United States Patent
Kasa

(10) Patent No.: US 8,225,172 B2
(45) Date of Patent: Jul. 17, 2012

(54) ERROR CORRECTION SCHEME FOR NON-VOLATILE MEMORY

(75) Inventor: Yasushi Kasa, Tokyo (JP)

(73) Assignee: Spansion LLC, Sunnyvale, CA (US)

( * ) Notice: Subject to any disclaimer, the term of this patent is extended or adjusted under 35 U.S.C. 154(b) by 1066 days.

(21) Appl. No.: 12/139,650

(22) Filed: Jun. 16, 2008

(65) Prior Publication Data

US 2009/0158123 A1    Jun. 18, 2009

(30) Foreign Application Priority Data

Jun. 15, 2007  (JP) .................. 2007-158750

(51) Int. Cl.
*H03M 13/00*    (2006.01)

(52) U.S. Cl. .............. 714/758; 714/766; 714/799
(58) Field of Classification Search ............. 714/758, 714/766, 799
See application file for complete search history.

(56) References Cited

U.S. PATENT DOCUMENTS

| | | | |
|---|---|---|---|
| 6,119,245 A | 9/2000 | Hiratsuka | |
| 6,957,377 B2* | 10/2005 | Furukawa | 714/763 |
| 7,359,296 B2* | 4/2008 | Noda et al. | 369/47.27 |
| 7,409,623 B2* | 8/2008 | Baker et al. | 714/763 |
| 7,426,623 B2* | 9/2008 | Lasser | 711/170 |
| 7,447,936 B2* | 11/2008 | Shiota et al. | 714/6.1 |
| 7,478,306 B2* | 1/2009 | Okamoto et al. | 714/758 |
| 7,525,852 B2* | 4/2009 | Kozakai et al. | 365/189.09 |
| 2004/0264254 A1 | 12/2004 | Eggleston et al. | |

* cited by examiner

*Primary Examiner* — Esaw Abraham

(57) ABSTRACT

Error correcting systems, methods, and devices for non-volatile memory are disclosed. In one embodiment, a non-volatile memory device comprises a data area for storing data, an error correcting code generation section for generating an error correcting code in response to receipt of a code generation command, and an error correcting code area for storing the error correcting code. The non-volatile memory device further comprises a detector circuit for detecting the generating of the error correcting code, and a read section for correcting the data stored in the data area based on the error correcting code upon the detecting of the generation of the error correcting code by the detector circuit, where the code generation command is forwarded by a memory controller when the data are is filled with the data beyond a threshold level.

10 Claims, 3 Drawing Sheets

ERROR CORRECTION SCHEME FOR NON-VOLATILE MEMORY

CLAIM OF PRIORITY

This application claims priority from Japanese patent application 2007-158750 filed on Jun. 15, 2007.

FIELD OF TECHNOLOGY

The present invention relates to semiconductor devices and methods, particularly to error correction of non-volatile memory devices.

BACKGROUND

An error correcting code (ECC) is implemented in a non-volatile memory (e.g., a flash memory) to improve the reliability of data stored in the non-volatile memory. That is, the ECC is generated and stored in the non-volatile memory as the data is written to the non-volatile memory. Subsequently, when the data is read, the ECC is processed using an ECC circuit to determine whether the data has been corrupted. If the ECC circuit detects an error in the data, the data is repaired before it is forwarded for processing.

Since the memory is divided into multiple data areas, such as sectors, a unit of the data area is linked with its respective ECC stored in a designated area of the non-volatile memory. For example, a 9 bit ECC area is allotted for each unit of 256 bit data area in a NAND flash memory. However, currently, the 9 bit ECC area can be programmed only once during initial programming of the unit data area. Thus, even if the initial programming leaves a sizable blank space, additional programming of the blank space is not permitted. This, in turn, results in a waste of the memory space.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One embodiment of the present invention is directed to a non-volatile memory device which comprises a data area for storing data, an error correcting code generation section for generating an error correcting code in response to receipt of a code generation command, and an error correcting code area for storing the error correcting code. The non-volatile memory device further comprises a detector circuit for detecting the generating of the error correcting code, and a read section for correcting the data stored in the data area based on the error correcting code upon the detecting of the generation of the error correcting code by the detector circuit, where the code generation command is forwarded by a memory controller when the data are is filled with the data beyond a threshold level.

Another embodiment of the present invention is directed to a non-volatile memory system which comprises a data area for storing initial data and a buffer for storing the initial data and additional data, where the additional data is programmed in the data area later than the initial data. In addition, the non-volatile memory system comprises an error correcting code generation circuit for generating an error correcting code for the initial data and the additional data in response to receipt of a code generation command and an error correcting code area for storing the error correcting code.

Yet another embodiment of the present invention is directed to a method for a non-volatile memory system with a data area programmed with initial data which comprises receiving a code generation command, and generating an error correcting code when additional data is programmed to the data area subsequent to the receiving of the code generation command, where the error correcting code is associated with the initial data and the additional data. The method further comprises storing the error correcting code in an error correcting code area associated with the data area.

As will be illustrated in the detailed description, other embodiments pertain to error correcting systems, methods, and devices for non-volatile memory. According to the embodiments, a code generation command is generated by a memory controller when a subjected data area of the non-volatile memory (e.g., a flash memory) is close to its full capacity with programmed or written data. Then, an error correction code associated with the programmed or written data is generated and stored in an error correction code area linked with the subjected data area. This scheme enables programming of data to the subjected data area multiple times until the code generation command is processed, thus achieving efficient use of the memory.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations for fabricating semiconductor devices. These descriptions and representations are the means used by those skilled in the art of semiconductor device fabrication to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Unless specifically stated otherwise as apparent from the following discussions, is appreciated that throughout the present application, discussions utilizing terms such as "forming," "performing," "producing," "depositing," or "etching," or the like, refer to actions and processes of semiconductor device fabrication.

Briefly stated, embodiments pertain to error correcting systems, methods, and devices for non-volatile memory. According to the embodiments, a code generation command is generated by a memory controller when a subjected data area of the non-volatile memory (e.g., a flash memory) is close to its full capacity with programmed or written data. Then, an error correction code associated with the programmed or written data is generated and stored in an error correction code area linked with the subjected data area. This scheme enables programming of data to the subjected data area multiple times until the code generation command is processed, thus achieving efficient use of the memory.

Figure 1:
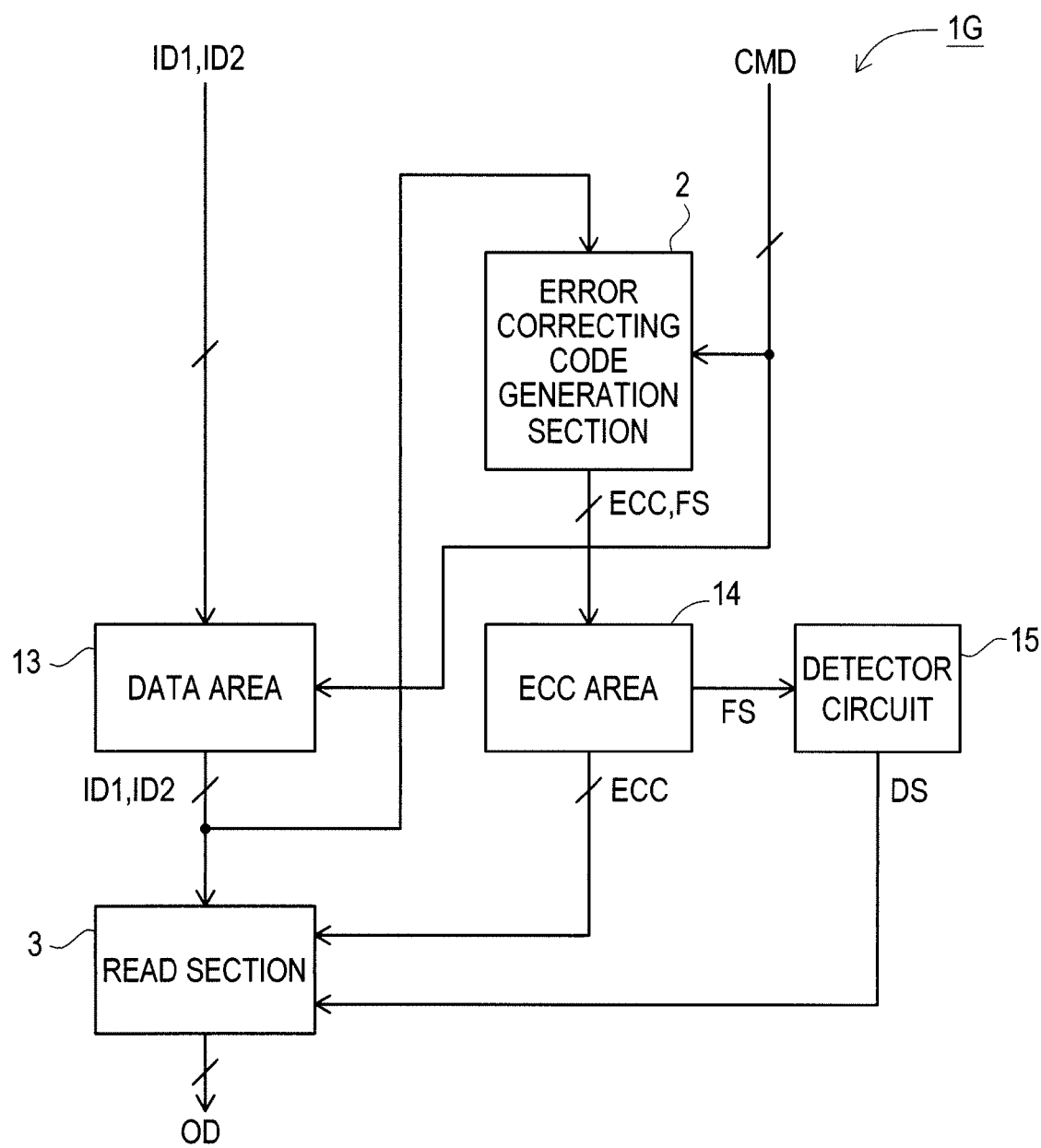
FIG. 1 is a block diagram of an exemplary non-volatile memory, according to one embodiment.

FIG. 1 is a block diagram of an exemplary non-volatile memory, according to one embodiment. A flash memory 1G comprises a data area 13, an ECC area 14, a detector circuit 15, an error correcting code generation section 2 and a read section 3. The data area 13 (e.g., a memory sector) and the ECC area 14 are composed of non-volatile memory elements which cannot be overwritten.

The data area 13 receives a first data ID1 and a second data ID2 from the outside one by one. First, upon input of the first data ID1, data is written into the data area 13 for the first time. Next, upon input of the second data ID2, data is written into free space of the data area 13 additionally. It is to be noted that additional writing can be made more than one time so far as there is free space in the data area 13 and thus data subsequent to the second data ID2 can be written additionally. Further, the data area 13 receives a code generation command CMD from a not-shown memory controller and the like, which are provided outside of the flash memory 1G. The code generation command CMD can be inputted at an arbitrary timing. In one embodiment, the code generation command may be forwarded when a combined size of the initial data (ID1 and ID2) and the additional data is approximately equal to a size of the data area or reaches a threshold level.

The error correcting code generation section 2 receives a code generation command CMD from the outside in addition to the first data ID1 and the second data ID2 from the data area 13. The error correcting code ECC and the flag signal FS generated by the error correcting code generation section 2 are inputted and stored into the ECC area 14. The error correcting code ECC outputted from the ECC area 14 is inputted into a read section 3, and the flag signal FS outputted from the ECC area 14 is inputted into the detector circuit 15. The detector circuit 15 outputs a detection signal DS. Then, the read section 3 receives the first data ID1 and the second data ID2, the error correction code ECC and the detection signal DS so as to output an output data OD.

An operation of the flash memory 1G will now be explained. Since an error correcting code ECC is generated from all the data stored in the data area 13, the error correcting code ECC is updated when additional data is written into the data area 13. However, the ECC area 14 for storing an error correcting code ECC is composed of non-volatile memory elements which cannot be overwritten. So, once an error correcting code ECC is written into the ECC area 14, an error correcting code ECC updated after that cannot be written into the ECC area 14. Therefore, data cannot be additionally written into the data area 13 once an error correcting code ECC is written into the ECC area 14.

During the period before input of the code generation command CMD, the error correcting code generation section 2 is set to an inactive state and an error correcting code ECC and a flag signal FS are not yet generated nor written in the ECC area. Thus, first writing of data into the data area 13 is possible and so is additional writing. Accordingly, upon input of the first data ID1 from the outside, data is written into the data area 13 for the first time. Then, upon input of the second data ID2, data is additionally written into free space of the data area 13. In this period, the detector circuit 15 detects that a flag signal has not been generated and then outputs a detection signal DS which represents that an error correcting code ECC has not been generated. In response to input of the detection signal DS, the read section 3 outputs the first data ID1 and the second ID2 read from the data area 13 as an output data OD without correction.

Next, in response to input of a code generation command CMD, generation of an error correcting code ECC and a flag signal FS is started. First, the first data ID1 and the second data ID2, which are all the data stored in the data area 13, are read in response to the code generation command CMD and inputted into the error correcting code generation section 2. The error correcting code generation section 2 generates an error correcting code ECC and a flag signal FS based on the first data ID1 and the second data ID2. The error correcting code ECC and the flag signal FS generated are written into the ECC area 14.

After the code generation command CMD is inputted, the detector circuit 15 detects by means of the flag signal FS that the error correcting code ECC has been generated. Then, the detector circuit 15 outputs a detection signal DS for notifying the detection of the error correcting code ECC. In response to the detection signal DS, the read section 3 corrects the first data ID1 and the second data ID2 read from the data area 13 by using the error correcting code ECC and then outputs the first data ID1 and the second data ID2 corrected as an output data OD.

As described above, it is possible to use the data area 13 as: a data area to which additional data can be written during the period before input of a code generation command CMD; and as a data area offering high reliability in data reading during the period after input of the code generation command CMD. In other words, a code generation command CMD makes it possible to switch states of the data area 13, at an arbitrary timing, namely, from a state where additional writing is possible to a state where high reliability in data reading is offered. Accordingly, it is possible to configure a flash memory 1G which meets the contradictory demands for overwriting of the data stored in a data area and high reliability in data reading from the data area.

Additionally, in one embodiment, a method for a non-volatile memory system with a data area 13 programmed with initial data comprises receiving a code generation command from the memory controller, generating an error correcting code when additional data is programmed subsequent to the receiving of the code generation command, where the error correcting code is associated with the initial data and the additional data, and storing the error correcting code in an error correcting code area 14 associated with the data area.

Figure 2:
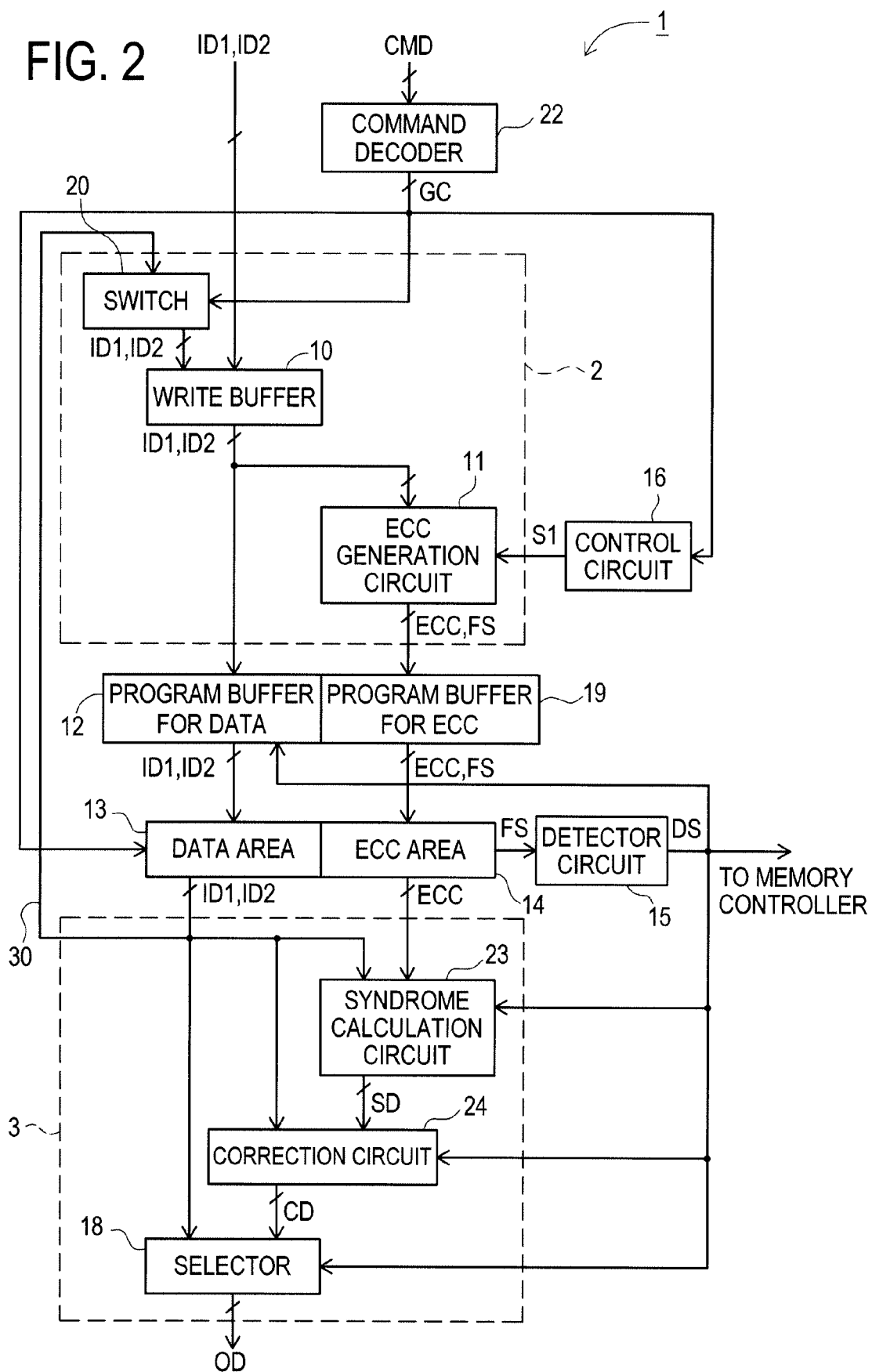
FIG. 2 is an exemplary circuit diagram of the non-volatile memory of FIG. 1, according to one embodiment.

FIG. 2 is an exemplary circuit diagram of the non-volatile memory of FIG. 1, according to one embodiment. A flash memory 1 comprises an error correcting code generation section 2, a read section 3, a program buffer 12 for data, a data area 13, a program buffer 19 for ECC, an ECC area 14, a detector circuit 15, a control circuit 16 and a command decoder 22. The error correcting code generation section 2 comprises a write buffer 10, an ECC generation circuit 11, and a switch 20. The read section 3 comprises a syndrome calculating circuit 23, a correction circuit 24, and a selector circuit 18.

The command decoder 22 receives a code generation command CMD from a not-shown memory controller and the like which are provided outside of the flash memory 1 and outputs a code generation instruction GC. The code generation command CMD can be inputted at an arbitrary timing. The write buffer 10 receives a first data ID1 and a second data ID2 from the outside of the flash memory 1 one by one. The write buffer 10 also receives the first data ID1 and the second data ID2 outputted from the data area 13 through an internal path 30 and the switch 20. The write buffer 10 serves as a buffer for storing user data and has a storage capacity larger than the data area 13. The first data ID1 and the second data ID2 outputted from the write buffer 10 are inputted to the ECC generation circuit 11 and the program buffer 12 for data. Also, a control signal S1 is inputted from the control circuit 16 to the ECC generation circuit 11. Subsequently, the ECC generation circuit 11 outputs an error correcting code ECC and a flag signal FS.

The program buffer 12 for data receives the first data ID1, the second data ID2, and a detection signal DS. The program buffer 12 for data serves as a buffer for storing the data to be written into the data area 13. The program buffer 19 for ECC receives the error correcting code ECC and the flag signal FS. The program buffer 19 for ECC serves as a buffer for storing the data to be written into the ECC area 14. The data area 13 receives and stores the first data ID1 and the second data ID2. The data area 13 also receives the code generation instruction GC. The ECC area 14 receives and stores the error correcting code ECC and the flag signal FS. The detector circuit 15 receives the flag signal FS outputted from the ECC area 14 and outputs a detection signal DS. The control circuit 16 receives the code generation instruction GC and outputs a control signal S1.

The data area 13 outputs the first data ID1 and the second data ID2. The syndrome calculation circuit 23 receives the error correcting code ECC, the first data ID1 and the second data ID2 and outputs a syndrome SD. The correction circuit 24 receives the syndrome SD, the first data ID1 and the second data ID2 and outputs a correction data CD. The selector circuit 18 receives the correction data CD, the first data ID1 and the second data ID2 and outputs an output data OD.

Figure 3:
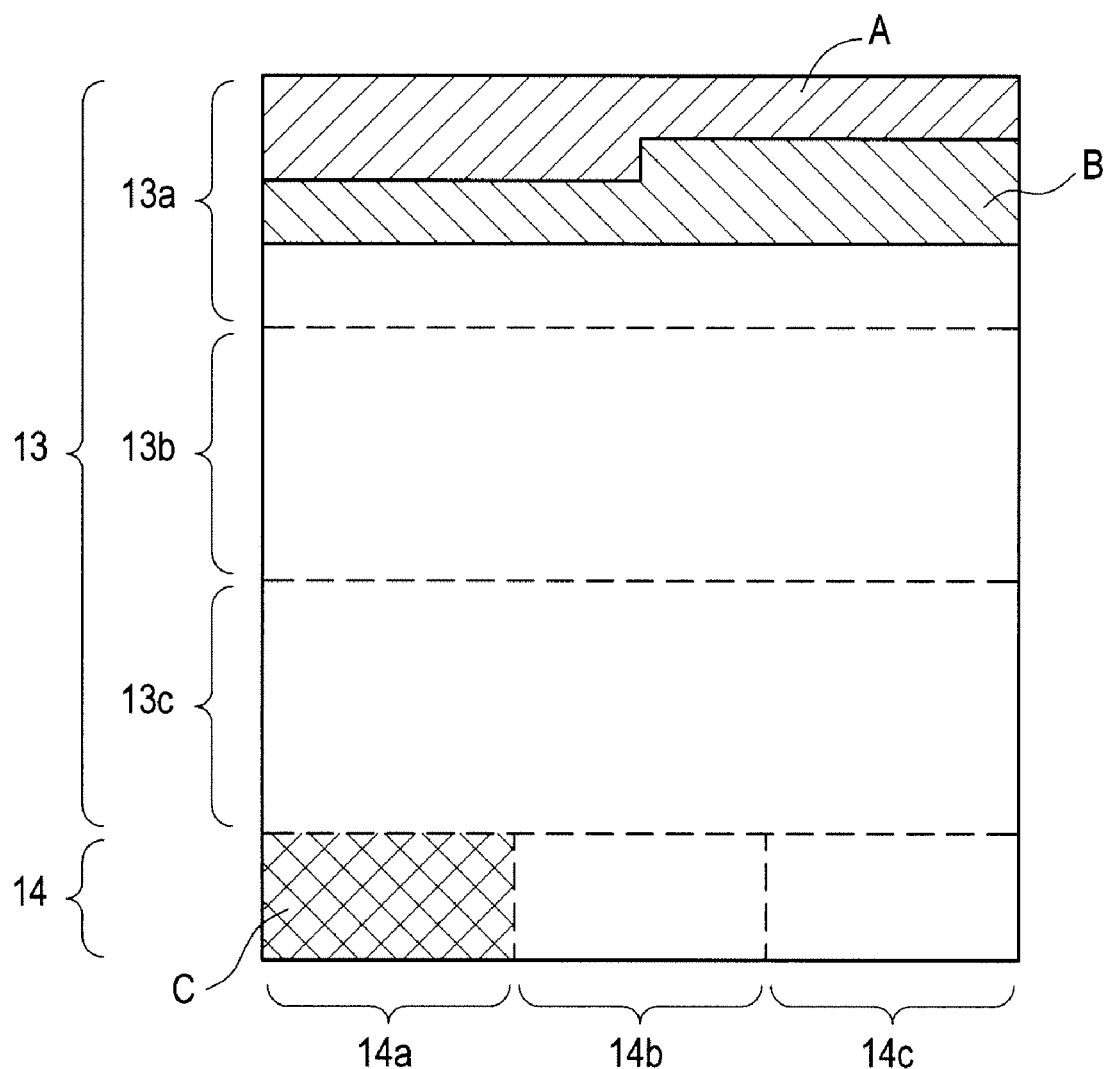
FIG. 3 is a detailed view of a data area and an error correcting code area of the non-volatile memory of FIG. 1, according to one embodiment.

FIG. 3 is a detailed view of a data area and an error correcting code area of the non-volatile memory of FIG. 1, according to one embodiment. The data area 13 comprises a plurality of sectors 13a to 13c. The ECC area 14 comprises sectors 14a to 14c which are respectively associated with the sectors 13a to 13c. Here, the code generation command CMD and the code generation instruction GC include information on a sector number. Accordingly, it is possible to read the data stored in the data area 13 by specifying any one of the sectors 13a to 13c in accordance with the sector number included in the code generation instruction GC. The ECC generation circuit 11 generates an error correcting code ECC and a flag signal FS by using the data read out from the designated sector. The control circuit 16 outputs a control signal S1 in accordance with the sector number included in the code generation command GC. Designation of a sector depends on the control signal S1: when the sector 13a is designated, the sector 14a is selected; and when the sector 13b is designated, the sector 14b is selected; and when the sector 13c is designated, the sector 14c is selected. Next, the sector selected from the sectors 14a to 14c receives to store the error correcting code ECC and the flag signal FS, outputted from the ECC generation circuit 11. In this manner, the ECC generation circuit 11 is activated to generate an error correcting code ECC by designating any one of the sectors 13a to 13c. Subsequently, the error correcting code ECC generated can be written into any one of the sectors 14a to 14c corresponding to the designated sector.

It is to be noted that, in the sectors 13a to 13c of the data area 13 and in the sectors 14a to 14c of the ECC area 14, all the bits in the sector can be rewritten from "0" to "1" simultaneously. However, it is not possible to individually rewrite the bits from "0" to "1". Since a "0" state of the bit cannot be changed to "1", update of the data in the sector is impossible.

Next, an operation of a flash memory 1 will be explained taking for example an operation when accessing the sector 13a of the data area 13. An operation of the flash memory 1 can be divided into three operation periods in accordance with input timing of a code generation command CMD: a period before input of a code generation command CMD; a period when a code generation command CMD is inputted; and a period after input of a code generation command CMD.

First, there will be explained a period before a code generation command CMD is inputted. In this period, an error correcting code ECC and a flag signal FS are not yet written into the sector 14a of the ECC area 14. The detector circuit 15 detects that a flag signal FS has not been written and outputs a detection signal DS of low level for notifying as such. The program buffer 12 for data is brought into an active state in response to the detection signal DS of low level. It is thus possible to write data into the sector 13a during this period. The ECC generation circuit 11 is in an inactive state, since a control signal S1 has not yet been inputted.

Upon input of a first data ID1 from the outside, it is inputted into the program buffer 12 for data and the ECC generation circuit 11 via the write buffer 10. In the program buffer 12 for data, the first data ID1 is first written into the sector 13a of the data area 13 (area A in FIG. 3). In the meantime, since the ECC generation circuit 11 is in an inactive state, an error correcting code ECC associated with the first data ID1 has not been generated by the ECC generation circuit 11.

During the period before input of a code generation command CMD, it is possible to write additional data into the sector 13a of the data area 13. Accordingly, when a second data ID2 is inputted from the outside, the data is additionally written into free space of the sector 13a via the program buffer 12 for data (area B in FIG. 3).

In the read section 3, the syndrome calculation circuit 23 and the correction circuit 24 are brought into an inactive state in response to the low-level detection signal DS. At the same time, the selector circuit 18 selects the data area 13 as an input source. Accordingly, the first data ID1 and the second data ID2 read out from the sector 13a of the data area 13 are outputted as an output data OD from the selector circuit 18 without being corrected by the correction circuit 24. As described above, the flash memory 1 can be used as a memory to which additional data can be written during this period.

Second, there will be explained an operation when a code generation command CMD designating the sector 13a is inputted. The command decoder 22 decodes the code generation command CMD inputted so as to output a code generation instruction GC designating the sector 13a. The control circuit 16 outputs a control signal S1 in response to input of the code generation instruction GC so as to shift the state of the ECC generation circuit 11 from an inactive state to an active state. In response to the input of the code generation instruction GC, the first data ID1 and the second data ID2, which are all the data stored in the sector 13a of the data area 13, are read out. In addition, the switch 20 is brought into an active state in response to the input of the code generation instruction GC. Subsequently, the first data ID1 and the second data ID2 read out from the data area 13 are stored into the write buffer 10 via the internal path 30.

The ECC generation circuit 11 receives the first data ID1 and the second data ID2 stored in the write buffer 10. The ECC generation circuit 11 generates an error correcting code ECC and a flag signal FS from the first data ID1 and the second data ID2. The error correcting code ECC and the flag signal FS generated are written into the sector 14a of the ECC area 14 via the program buffer 19 for ECC (area C in FIG. 3). As described above, an error correcting code ECC and a flag signal FS for the first data ID1 and the second data ID2 stored in the sector 13a are generated to be written into the sector 14a of the ECC area 14 during this period.

Third, there will be explained an operation when accessing the sector 13a during a period after a code generation command CMD is inputted. In this time, the detector circuit 15 detects that a flag signal FS has been written into the sector 14a and outputs a detection signal DS of high level for notifying as such. The detection signal DS is transmitted to a not-shown memory controller outside of the flash memory 1, and then the memory controller restricts writing of data into the sector 13a. In addition, the program buffer 12 for data is brought into an inactive state in response to the detection signal DS of high level. Accordingly, writing of data into the sector 13a is inhibited.

In the read section 3, the syndrome calculation circuit 23 and the correction circuit 24 are brought into an active state. At the same time, the selector circuit 18 selects the correction circuit 24 as an input source. The first data ID1 and the second data ID2 read from the sector 13a are inputted into the syndrome calculation circuit 23, the correcting circuit 24, and the selector circuit 18. The syndrome calculation circuit 23 calculates a syndrome SD from the first data ID1, the second data ID2 and the error correcting code ECC. In accordance with the syndrome SD, the correcting circuit 24 performs error correction when an error is observed and outputs a correction data CD. The selector circuit 18 outputs the correction data as an output data OD. As described above, during a period after a code generation command CMD is inputted, the first data ID1 and the second data ID2 read from the sector 13a are corrected by using an error correcting code ECC. Accordingly, the flash memory 1 is used as a memory offering high reliability in data reading.

As is clear from the above explanation, the present embodiment makes use of the data area 13 as follows: a data area in which additional data can be written during a period before input of a code generation command CMD; and a data area offering high reliability in data reading during a period after input of a code generation command CMD. In other words, the code generation command CMD can switch the state of the data area 13 from an additionally writable state to a state where high reliability in data reading is offered. Accordingly, it is possible to provide a flash memory 1 which can meet two contradictory demands for: overwriting the data in a data area; and offering high reliability in reading the data from a data area.

It is to be noted that the present invention is not restricted to the above-described embodiment, but needless to say, may be improved or modified in various ways within a scope not departing from the invention. In the embodiment, there has been explained a case where a code generation command CMD alone is inputted into the command decoder 22. However, it is possible to adapt the invention in a manner that a third data ID3 is inputted to the write buffer 10 concurrently with input of a code generation command CMD. In that case, the write buffer 10 combines and stores the third data ID3 newly inputted, and the first data ID1 and the second data ID2 read via the internal path 30. In other words, the write buffer 10 stores all the data to be stored in a data area 13 at the time of input of a code generation command CMD, that is, the first data ID1 to the third data ID3. Subsequently, by using the first data ID1 to the third data ID3 outputted from the write buffer 10, the ECC generation circuit 11 generates an error correcting code ECC. Further, the third data ID3 is additionally written into free space of the sector 13a via the write buffer 10 and the program buffer 12 for data.

Also, the embodiment is described in the context of using the flash memory 1 with input of a code generation command CMD. However, it is needless to say possible to use the flash memory 1 without input of a code generation command CMD. That is, when high reliability in data reading is more necessary, the flash memory 1 may be used with input of a code generation command CMD. On the other hand, when additional writing of data is more necessary than high reliability in data reading, the flash memory 1 may be used without input of a code generation command CMD. In this manner, the flash memory 1 can be used in different manners depending on whether or not a code generation command CMD is inputted. Accordingly, two types of memories, that is, a memory offering high reliability in data reading and a memory to which data can be additionally written, can be realized from a single type of flash memory 1. This eases the necessity for designing different non-volatile memory devices depending on types of memories, so that cost reduction can be achieved.

Also in the embodiment, the detector circuit 15 determines whether or not an error correcting code ECC has been generated depending on the flag signal FS written in the ECC area 14. However, the detector circuit 15 may needless to say determine whether or not an error correcting code ECC is generated by directly monitoring the error correcting code ECC stored in the ECC area 14. For instance, when all the bits of the error correcting code ECC stored in the ECC area 14 are "1", it is possible to determine that an error correcting code ECC has not yet been generated and written, and when at least one of the bits of the error correcting code ECC is "0", it is possible to determine that an error correcting code ECC has already been generated and written. In this manner, a flag signal FS becomes unnecessary and whereby a space for storing a flag signal FS does not need to be reserved in the ECC area 14. Therefore, the size of the ECC area 14 can be reduced.

Also in the embodiment, a code generation command CMD and a code generation instruction GC include information on sector number and whereby an error correcting code ECC can be generated by designating an arbitrary sector. However, it is needles to say that the code generation command CMD and the code generation instruction GC do not need to include information on sector and error correcting code ECC may be generated for all the sectors simultaneously. It is to be noted that the ECC generation circuit 11 is one example of a code generation circuit, the write buffer 10 is one example of a buffer, and the internal path 30 and the switch 20 are one example of an input path.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-volatile memory device comprising:
a data area for storing data;
an error correcting code (ECC) generation section for generating an error correcting code in response to receipt of a code generation command;
an error correcting code area for storing the error correcting code;
a detector circuit for detecting the generated error correcting code; and
a read section for repairing the data stored in the data area based on the error correcting code upon the detecting of the generated error correcting code by the detector circuit,
wherein the code generation command is forwarded by a memory controller when the data area is filled with the data beyond a threshold level.

2. The non-volatile memory device according to claim 1, wherein the error correcting code generation section generates a flag information in conjunction with the generating of the error correcting code.

3. The non-volatile memory device according to claim 2, wherein the detector circuit detects the generated error correcting code in response to the flag information.

4. The non-volatile memory device according to claim 2, wherein the error correcting code area stores the flag information.

5. The non-volatile memory device according to claim 4, wherein the detector circuit receives the flag information from the error correcting code area.

6. The non-volatile memory device according to claim 1, wherein the detector circuit outputs a detection result representing that the error correcting code has not been generated when every bit of the error correcting code is the same, and
the detector circuit outputs a detection result representing that the error correcting code has been generated when at least one bit of the error correcting code is different from remaining bits of the error correcting code.

7. The non-volatile memory device according to claim 1, wherein the error correcting code generation section comprises:
a code generation circuit that generates the error correcting code;
a buffer; and
an input path that forwards the data stored in the data area to the buffer in response to the code generation command.

8. The non-volatile memory device according to claim 7, wherein the buffer combines additional data written to the data area with the data stored in the data area forwarded to the buffer via the input path in response to the receipt of the code generation command, wherein combined data of the additional data and the data stored in the data area are forwarded to the code generation circuit.

9. The non-volatile memory device according to claim 1, wherein the read section comprises a correction circuit that repairs the data stored in the data area based on the error correcting code.

10. The non-volatile memory device according to claim 9, wherein the read section further comprises a selector that receives a first output from the correction circuit and a second output from the data area, with the selector circuit selecting the second output when receiving a notification from the detector circuit that the error correcting code has not been generated, and with the selector selecting the first output when receiving notification from the detector circuit that the error correcting code has been generated.

* * * * *